D. G. GOLOGAN.
COOKING UTENSIL.
APPLICATION FILED MAY 5, 1915.
1,228,108.
Patented May 29, 1917.
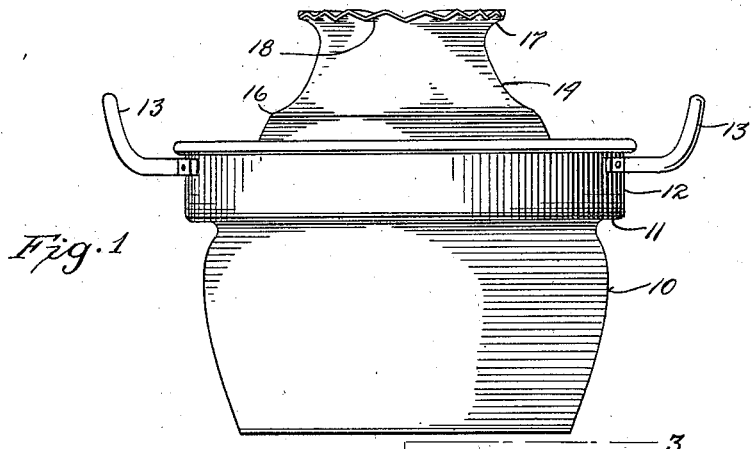
Fig. 1.
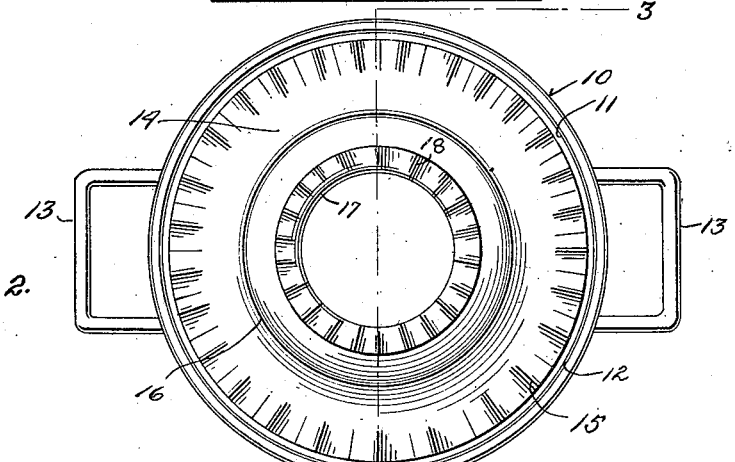
Fig. 2.
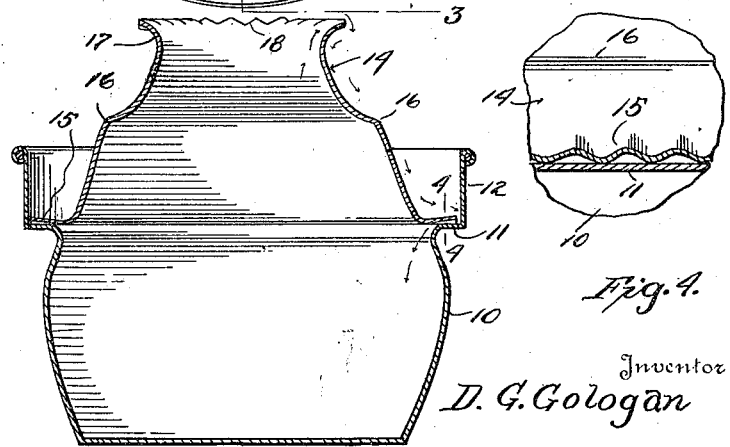
Fig. 3.
Fig. 4.
Witnesses
Inventor
D. G. Gologan
By 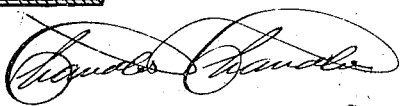
Attorney

UNITED STATES PATENT OFFICE.

DUMITRU G. GOLOGAN, OF NEWARK, NEW JERSEY.

COOKING UTENSIL.

1,228,108.  Specification of Letters Patent.  Patented May 29, 1917.

Application filed May 5, 1915. Serial No. 26,096.

*To all whom it may concern:*

Be it known that I, DUMITRU G. GOLOGAN, a citizen of the United States, residing at Newark, in the county of Essex, State of New Jersey, have invented certain new and useful Improvements in Cooking Utensils; and I do hereby declare the following to be a full, clear, and exact description of the invention, such as will enable others skilled in the art to which it appertains to make and use the same.

This invention relates to improvements in cooking utensils.

The principal object of the invention is to provide a novel and simple cooking utensil which will prevent liquids from boiling over on to the stove.

Another object is to provide a device of this character which will permit the liquid to boil over the top of the utensil, but that the liquid will be partially cooled before it reënters the vessel at a lower point.

Other objects and advantages will be apparent from the following description when taken in connection with the accompanying drawing.

In the drawing:

Figure 1 is an elevation of a cooking utensil made in accordance with my invention, Fig. 2 is a top plan view, Fig. 3 is a transverse section on the line 3—3 of Fig. 2, and Fig. 4 is an enlarged vertical section on the line 4—4 of Fig. 3.

Referring particularly to the accompanying drawing, 10 represents a suitable vessel which is offset around its upper portion to form a shoulder or ledge 11, from whence the side wall of the receptacle extends vertically, as shown at 12. Suitable handles 13 are secured to these vertical walls on diametrically opposite sides.

A cover 14 which has a general upward taper is provided with a horizontal corrugated flange 15 which rests on the said ledge or shoulder 11, the flange being slightly shorter than the shoulder so that the periphery of said flange will be spaced a short distance from the vertical wall 12. Midway of the height of the cover 14 is formed a circumferential rounded shoulder 16, while the upper open end flares outwardly, as at 17 and is formed with a plurality of notches 18.

It is well known that with the ordinary open pans or pots in which boiling is done, the same have to be watched so as to prevent the liquid contents from boiling over on to the stove with the consequent smoke and odors which soon spread throughout the house. With the present device this difficulty is overcome for the reason that the contents can boil over but will be returned into the receptacle without danger of getting on to the stove.

With boiling milk, for instance, it is well known that this soon rises and overflows in the utensil forming the subject-matter of this application, the overflowing milk will drop from the flaring edge 17 and drop on to the rounded shoulder 16, from whence it will run toward the shoulder 11 and corrugated flange 15. The milk will have sufficient time in which to cool slightly while it is running over the shoulder 16. The corrugations of the flange 15 extend radially so as to space the flange at equal points throughout its entire circumference above the shoulder and thus form a plurality of channels through which the milk which runs from the shoulder 16 will flow back into the receptacle. When the boiling milk rises into the cover 14, the channels formed with the corrugated flange 15 will be filled with films of milk so that the milk will not run out at these points. These films are immediately broken when the milk which runs down the shoulder 16 enters the channels. Thus, the liquid can boil over without danger of getting on to the stove and producing smoke and disagreeable odors. Furthermore, it obviates the necessity for close watching on the part of the cook.

What is claimed is:

In a cooking vessel the combination with a receptacle having a vertically flanged horizontal shoulder, of a member arranged for disposition on said shoulder and comprising a generally upwardly tapering hollow body open at both ends, the bottom of said body being formed with an outwardly directed horizontal flange, said flange having transverse corrugations formed therein, the lower portion of the side wall of the body being straight and inclining upwardly, the upper portion of the wall of the body being curved inwardly and meeting the lower portion to form a circumferential shoulder, the upper end of the body being flared outwardly.

In testimony whereof, I affix my signature, in the presence of two witnesses.

DUMITRU G. GOLOGAN.

Witnesses:
    E. A. NEWCOMER,
    VASSILIOS CALOUDES.